United States Patent [19]

Salvador et al.

[11] Patent Number: 4,700,022
[45] Date of Patent: Oct. 13, 1987

[54] METHOD AND APPARATUS FOR DETERMINING THE COORDINATES OF A CONTACT POINT ON A RESISTIVE TYPE SEMIANALOG SENSITIVE SURFACE

[75] Inventors: Jean-Louis Salvador, Aubervilliers; Denis Bosquain, Rueil Malmaison, both of France

[73] Assignee: Regie Nationale des Usines Renault, Boulogne Billancourt, France

[21] Appl. No.: 685,900

[22] Filed: Dec. 24, 1984

[30] Foreign Application Priority Data

Dec. 26, 1983 [FR] France ................................ 83 20793

[51] Int. Cl.$^4$ ............................................. G08C 21/00
[52] U.S. Cl. ................................ 178/18; 340/347 AD; 178/19
[58] Field of Search .............................. 178/18, 19, 20; 340/347 AD, 347 P

[56] References Cited

U.S. PATENT DOCUMENTS

| | | | |
|---|---|---|---|
| 3,806,912 | 4/1974 | Eckert | 178/18 X |
| 4,164,622 | 8/1979 | Pobgee | 178/18 |
| 4,571,577 | 2/1986 | Taupin et al. | 178/18 |

Primary Examiner—Stafford D. Schreyer
Attorney, Agent, or Firm—Oblon, Fisher, Spivak, McClelland & Maier

[57] ABSTRACT

A method and apparatus for determining the coordinates of a point of contact of an object on a semianalog sensitive surface. The coordinates are of a zone of contact of a conductive object such as a finger on a sensitive surface. The surface consists of an insulating support having a grid formed by two terminals between which a certain number of emitting resistant strips are connected in parallel and detecting conductive strips, placed between the resistant strips. The conductive strips are connected separately to a selection switch making it possible successively to sample the voltage of each detecting strip. The operation is performed in two phases by polarizing the two terminals of the grid, first in phase, then in opposite phase, and in each phase of the process the averages are taken of a certain number of synchronous samples which make it possible to determine the two coordinates.

11 Claims, 14 Drawing Figures

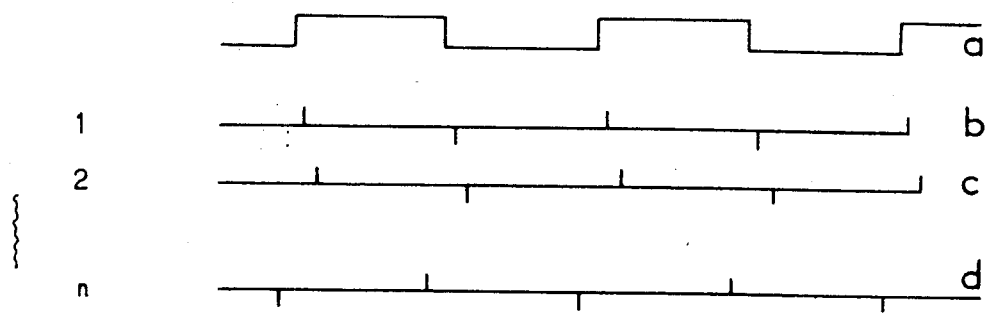
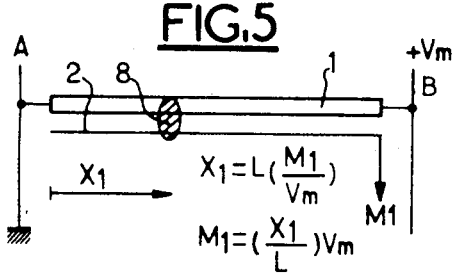
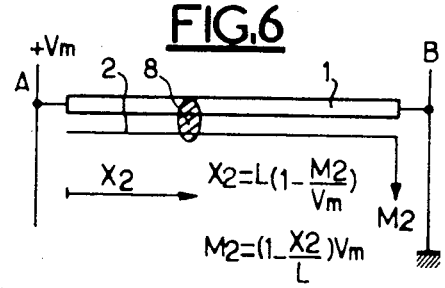
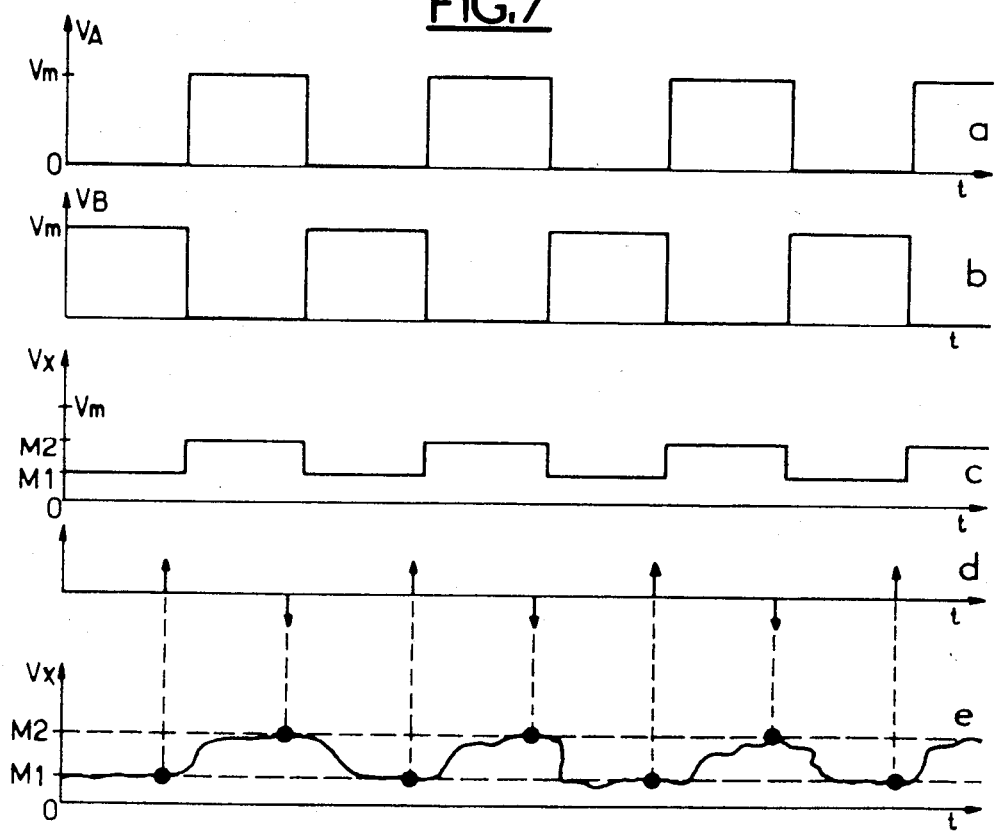

METHOD AND APPARATUS FOR DETERMINING THE COORDINATES OF A CONTACT POINT ON A RESISTIVE TYPE SEMIANALOG SENSITIVE SURFACE

BACKGROUND OF THE INVENTION

1. Field of the Invention:

This invention relates generally to a method and apparatus for determining the location of a point and more particularly to a method and apparatus for determining the coordinates of a contact point on a resistive type semianalog sensitive surface.

2. Discussion of Background:

There are known, such as shown by French Pat. No. 2,520,498 sensitive surfaces of the type consisting of a support, generally of a glass plate, on which are placed a grid consisting of two terminals between which a certain number of emitting resistant strips are connected in parallel. Also placed on the support are conductive detecting strips placed between the resistant strips and connected separately to a selecting switch so that the voltage of each conductive strip is sampled indidually in successsion. The emitting resistance strips and the conductive detecting strips, which can also have some resistance, most often consist of a thin conductive enamel deposited on the glass plate. When a conductive object, for example an ordinary finger, comes to rest on this sensitive surface, it forms an electrical connection between at least one detecting strip and at least one emitting strip of the grid. By scanning the various strips with a selector, it is possible to digitally determine the coordinates, which are determined by the number of the detecting strip where a voltage is detected, and an analog determination of the other coordinate by the value of this voltage.

Preferably, as described in said French patent application, said emitting strips are alternately polarized in opposite directions. For each direction of polarization, a certain number of measurements are made of the voltage of each detecting strip whose averages are computed separately, and the coordinates of the finger are deduced by comparing the averages obtained.

Although such a process makes it possible to solve a great number of problems presented by the use of sensitive surfaces of this type, some difficulties in practical use still remain, such as are listed below.

The electrical contact resistance of the skin at the end of the operator's finger is highly variable and most often large (50 kΩ to 1MΩ) and would allow only the passage of a current of very small intensity between the grid and the detecting strip. Therefore, only a detector with very high impedance can be used.

For obvious reasons of user safety, only very low excitation voltages can be used. The user's body conducts direct voltages through the fingertip not only from contact with another point of the circuit, but also by static electricity, and especially alternating voltages by an antenna effect with ambient spurious signals. The combination of these two effects makes it difficult to obtain a favorable signal/noise ratio, and consequently, precise measurements.

The variability of the useful signal in relation to a constant background noise leads to extremely variable relative variations over the extent of the surface, particularly in the direction of the analog measurement nearing zero.

Finally, scanning the various strips by the selector and taking various measurements can take considerable time, which is impractical for the user if standard filtering techniques are used.

The present invention aims at providing a method and apparatus that make it possible to overcome the above difficulties which are encountered in scanning of sensitive surfaces of this type, i.e., which meet all the requirements of safety, precision and speed.

SUMMARY OF THE INVENTION

Accordingly, one object of this invention is to provide a novel method for locating the position of an object touching a sensitive surface.

Another object of this invention is to provide a novel apparatus for locating the position of an object touching a sensitive surface.

A further object of this invention is to provide a method and apparatus for locating the position of an object accurately despite the presence of noise.

A still further object of this invention is to provide a method and apparatus for locating the position of an object quickly and accurately.

Another object of this invention is to provide a method and apparatus for locating the position in two directions of an object touching a sensitive surface safely, quickly and accurately.

In the process according to the present invention, a clock signal of a suitable frequency having a squarewave voltage is used during a first period when the two terminals of the grid are polarized in phase with the clock signal, a synchronous sampling is taken of the voltage of each detecting strip during the alternate on and off periods of the clock signal, averages are taken of a certain number of samples separately for the on and off periods, the two averages thus obtained are compared to detect whether there is a contact and to determine the digital coordinate by determining the number of the strip where the contact is detected. Then during a second period, while remaining turned on to this same detecting strip, the two terminals of the grid are polarized in opposite phase to one another by the clock signal, so as to create a current alternately in both directions in each emitting resistant strip, a synchronous sampling of the voltage of said detecting strip is taken during the alternate periods of each direction of current, averages of a certain number of samples are taken, separately for both directions, and finally the difference is taken of these averages to compute the analog coordinate.

The invention also has as its object a device for using a process for the determination of the X and Y coordinates of a zone of contact of a conductive body such as a finger on a semianalog sensitive surface consisting of a grid formed by two terminals between which a certain number of emitting resistant strips are connected in parallel and detecting strips are placed between the emitting strip and connected separately to a strip selector a clock signal generator, reversing switches able to switch each of the two terminals of the grid respectively to a polarization voltage and to ground, these reversing switches being able to be controlled separately in opposite phases by the clock signal, a sampling device synchronous with the clock signal, a device for working out the average of a certain number of samples, separately for the two half-waves of the clock signal, and a logic device, which controls the reversing switches, as well as the strip selector means and the sampling device, performs the counting of the samples and determines the values of the two coordinates X, Y.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a series of voltage curves as a function of time relative to the determination of the digital coordinates;

FIG. 5 is a simplified electrical diagram showing the determination of the analog coordinate;

FIG. 6 is a simplified electrical diagram showing the determination of the analog coordinate;

FIG. 7 is a graph showing curves illustrating this determination;

DESCRIPTION OF THE PREFERRED EMBODIMENTS

Figure 1:
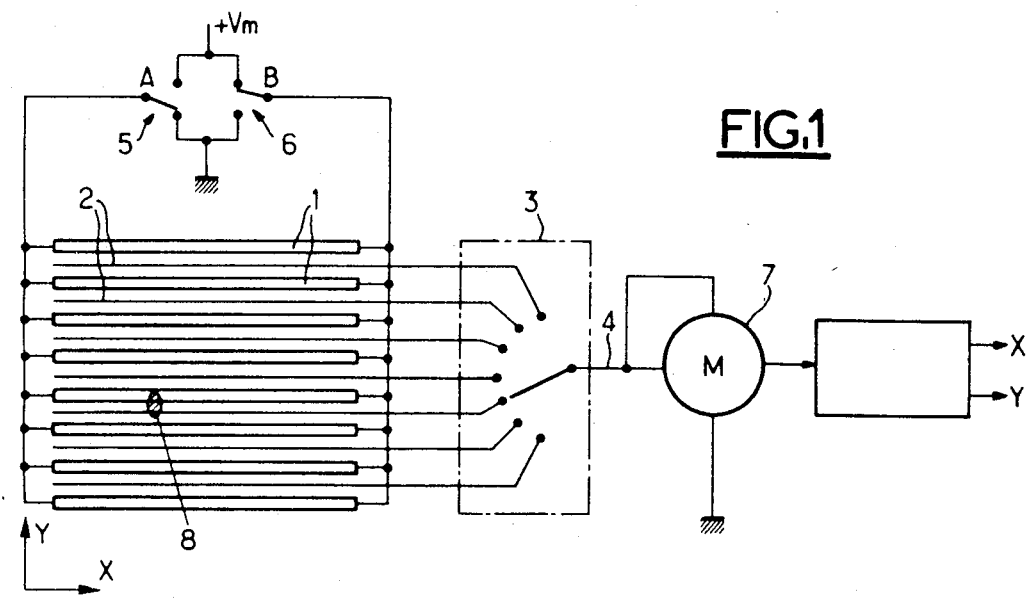
FIG. 1 is a block diagram of the switching apparatus of the present invention.

Referring now to the drawings, wherein like reference numerals designate identical or corresponding parts throughout the several views, and more particularly to FIG. 1 thereof, which shows diagrammatically the resistance strips 1 and the conductive detecting strips 2. Resistance strips 1 are all connected in parallel between two terminals A and B to constitute the grid, while all the detecting strips 2 are connected, each individually, to various inputs of a selection means 3 which makes it possible successively to sample each of the voltages of strips 2 at output 4.

Whereas with the background device, one terminal, for example A, is constantly connected to zero potential, while the other terminal B is connected to a direct-current voltage, in the present invention, two reversing switches 5 and 6 or an equivalent unit of four simple electronic switches are used to assure connection of A and B separately, respectively, to direct voltage +Vm and ground, as shown in FIG. 1.

This switching device therefore makes possible four connection combinations:
(1) A and B to ground,
(2) A and B to voltage +Vm,
(3) A to ground and B to +Vm (case of FIG. 1),
(4) A to +Vm and B to ground.

In all that follows Y will be the digital coordinate (strip number) and X the analog coordinate (position along the strip). As with the background process, Y and X will be determined successively, with an effort being made to eliminate spurious signal effects.

The first two connection combinations will actually be used in the first phase of the process (determination of Y) and the last two in the second phase of the process (determination of X).

Figure 2:
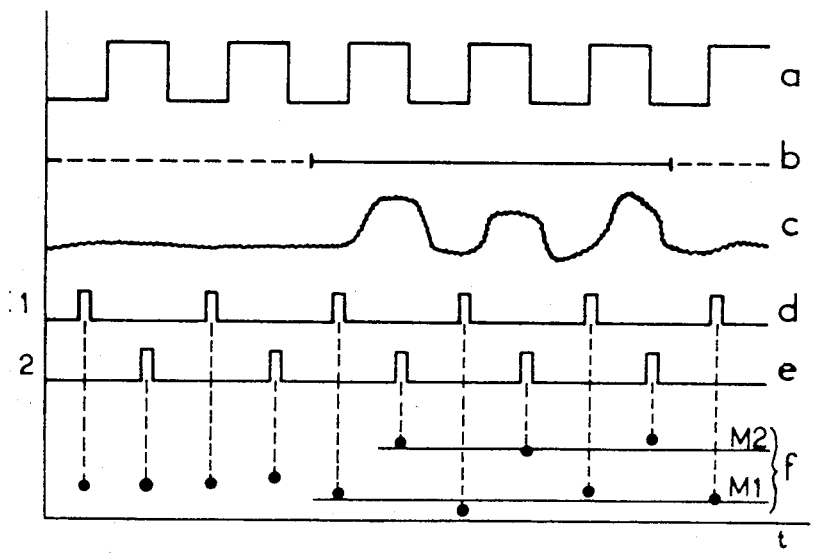
FIG. 2 is a series of representative voltage curves as a function of time, relative to the determination of the digital coordinate.

According to the present invention, a clock signal is used, which is produced by a known device (not shown) and has as high a frequency as possible. This clock signal is in the form of a square-wave voltage as shown in FIG. 2a. This clock signal is used to control the switching of reversing switches A and B, alternately in the two first positions indicated above.

The periods of the clock signal being off (zero level) produce the connection of A and B with the ground, while the periods of the clock signal being on (level 1) produce the connection of A and B with voltage +Vm.

At the same time, it is assumed that selector 3 for the moment is positioned on a specific strip. FIG. 2b shows by a segment in solid line the length of time that of a finger contacts this strip, which is reflected by conduction over several clock signals.

FIG. 2c shows approximately the signal obtained in the measuring device represented diagrammatically as 7 in FIG. 1. As long as there is no contact, this signal simply presents the action of spurious signals picked up by the grid, while in the zone corresponding to segment 2b there is a greater level when A and B are connected to +Vm than when A and B are connected to the ground, although in this case the noise level is higher because of the pickup of ambient spurious signals by the user's body.

Starting with this curve with very great spurious signals, according to the invention a precise signal will be extracted by using a double sampling in synchronism with the clock signal. Sampling 1 corresponds to a short period, about 1 ms, within the off periods of the clock signal, while sampling 2 also corresponds to short periods of similar duration within the on periods of the clock signal. These samplings, when taken at the times indicated in FIGS. 2d and 2e and applied to curve 2c, make it possible to obtain the measurements shown by the points in FIG. 2f, with the height of each point corresponding to the level of the measurement made on the sample considered.

It can then be seen that if the average of the unequal samples and of the equal samples is taken separately, almost identical values are obtained outside the contact zone, and relatively different values M1 and M2 are obtained in the contact zone.

When the averages M1 and M2 of a specific number of samples (for example, about ten) differ by an amount greater than a threshold established in advance, it can then be said with considerable assurance that the presence of a contact has been detected. On the other hand, if the test is negative, i.e., if the difference is less than the threshold, selector 3 is incremented to go to the following detecting strip.

Figure 3:
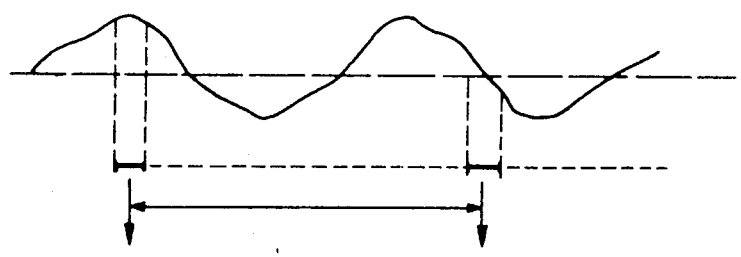
FIG. 3 is a voltage curve as a function of time relative to the determination of the digital coordinates.

It is known that for a synchronous detection, the frequency of the exciting signal should be chosen so that it is neither a multiple nor submultiple of the frequency of the most undesirable spurious signals. This constraint can be difficult to satisfy if the spurious signals have a very low frequency, as is the case particularly of spurious signals induced by the distribution grid sector. For this reason, according to the invention, another resource is used which is to act over the period of the tests and therefore over the frequency of the scanning cycle. For example, FIG. 3 shows a curve representative of the level of spurious signals at 50 Hz, the segments placed below represent the occurrence and length of the test corresponding to a particular detecting strip. It can be seen that if the first passage leads to a negative test because of maximum noise, the second passage will give a usable test because the noise level will be minimal.

To obtain this result, according to the invention, a cycle frequency is selected from the terms of the series:

$$2.Fr/(n+\tfrac{1}{2})$$

where Fr is the frequency of the power grid and n is a positive integer or zero. In the case of 50 Hz, the most widely used frequency in many parts of the world, the following values are found:

200 Hz, 67 Hz, 40 Hz ...

A result equivalent to that just described can be attained by scanning the detecting strips very rapidly, during one half-cycle of the clock signal. In this case, it is necessary to store in parallel the results of series of samples of each of the detecting strips separately, to allow computation of the averages relative to each of these strips. The same considerations apply to the excitation and scanning frequencies. FIG. 4 shows the characteristic staggering of the various samplings that have been grouped on the same line for the even and odd samplings of each strip.

It is also possible to combine the two preceding processes by considering the detecting strips in groups which are processed according to the preceding embodiment. This makes it possible to seek the best compromise between speed and memory size in the case of very great surfaces involving a high number of strips.

When the number of the detecting strip in contact is located, the process continues to measure analog coordinate X, while leaving selector 3 connected to this same strip that has been located. For this purpose, reversing switches 5 and 6 continue to be controlled by the clock signal, but in opposite phases, i.e., using the last two of the four combinations examined above. For example, it is possible to put A in phase with the clock signal and B in opposite phase with this clock signal as shown on curves 7a and 7b.

FIG. 5 diagrammatically shows a resistant strip 1 and a detecting strip 2, in this case insulated from the connection with A to ground, and FIG. 6 shows the equivalent diagram in the case where B is grounded. In these figures, hatched surface 8 represents the area of contact of the finger, which actually acts like a wiper of a potentiometer made up of resistance 1 connected between A and B and whose detecting strip 2 assures the transmission of the voltage (regardless of what its own resistance may be).

In the case of FIG. 5, as shown in the French Pat. No. 2,520,498, it can be shown that the measured voltage M1 is expressed as a function of the abscissa X1 by:

$$M1 = \frac{X1}{L} \text{ or } X1 = L\left(\frac{M1}{Vm}\right)$$

likewise in the case of FIG. 6, it can be shown that:

$$X2 = L\left(1 - \frac{M2}{Vm}\right) \text{ or } M2 = \left(1 - \frac{X2}{L}\right) Vm$$

These formulas show that if the contact were precise, localized and did not have spurious signals, and that consequently X1=X2, then M1+M2=Vm. Because of variable spurious signals, this is generally not so and the values obtained for X1 and X2 are different. This then leads to taking the average between X1 and X2, which gives as values:

$$X = \frac{L}{2}\left(1 - \frac{M2 - M1}{Vm}\right)$$

Figure 8:
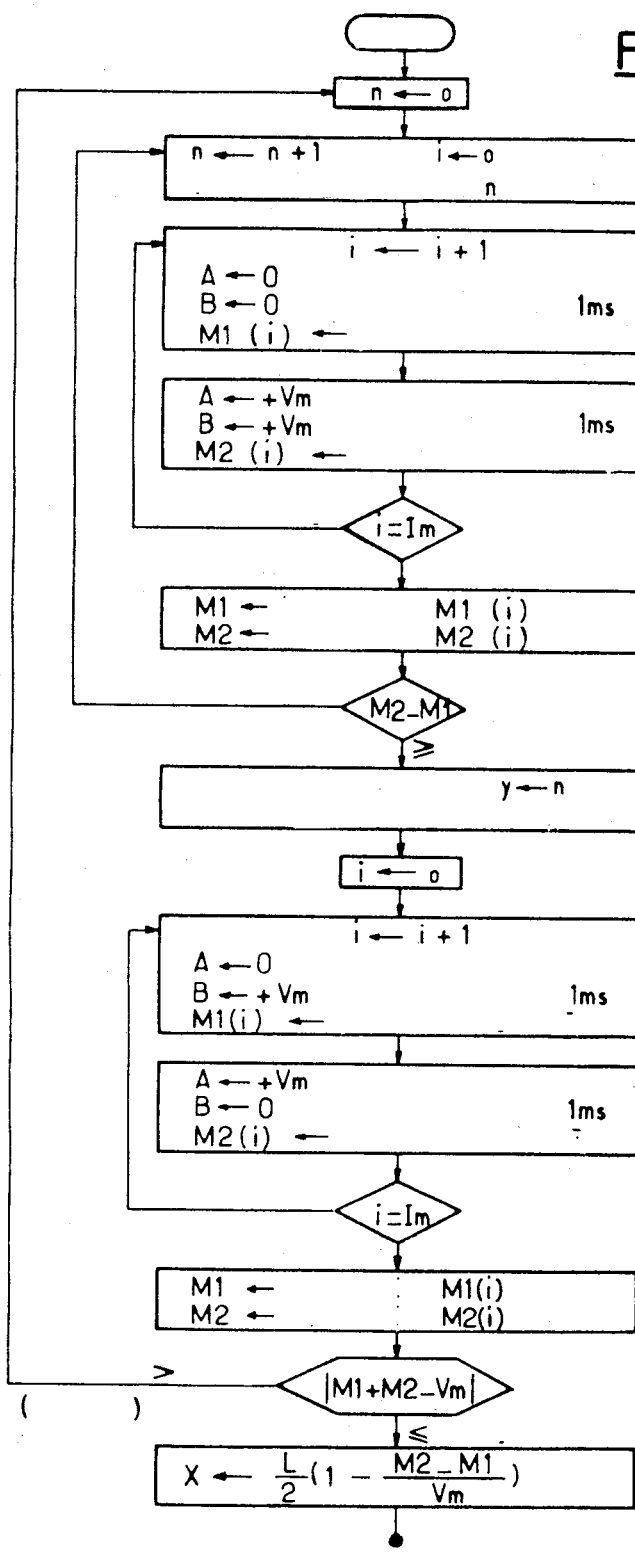
FIG. 8 is a general flow chart of the process.

As in the first phase of the process, M1 and M2 are still obtained by synchronous sampling and taking of separate averages from a certain number of measurements (about ten, for example) to eliminate spurious signals effects A particularly simple validity criterion is used which consists in verifying whether the sum M1+M2−Vm is less in absolute value than a permissible threshold error. If so, the measurement is validated. If not, the measuring operation is begun again, as appears clearly in the flow chart in FIG. 8. This validity criterion in particularly effective against very low frequency disturbances which have the effect of shifting the two averages M1 and M2 in the same direction in the sampling sequence.

It should be noted that the formula for calculating X, by being symmetrical, offers the advantage of masking the extremity effect where the voltages to be measured are almost zero and, for this reason, very sensitive to disturbances.

The invention therefore always starts from a semianalog sensitive surface of the known type and produces two digital values X and Y. Also in all cases and in the successive phases of the process, a sampling is made of several successive values of the same magnitude, and then the average of these values is worked out, separately for the even and odd measurements.

Figure 9:
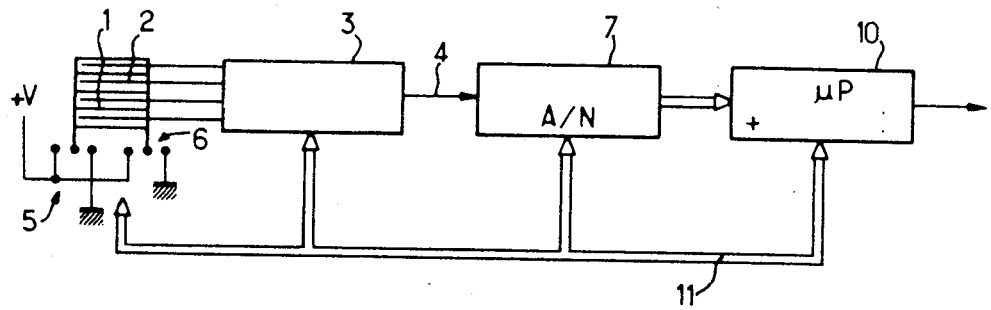
FIG. 9 is a diagram of an entirely digital device of the present invention.

However, several variants are possible which differ from one another in the manner of calculating these averages. In the embodiment of FIG. 9, are seen sensitive surface 1, 2 and its two reversing switches 5 and 6, as well as selector 3 advantageously consisting of an electronic multiplexer. The measuring device 7 of FIG. 1 in this embodiment becomes an analog-to-digital converter which transforms each voltage of line 4 into a digital measurement. This digital signal is sent to microprocessor 10, equipped with a memory and which assures a digital summation of the various values M1 (i) and M2 (i) so as to calculate, by arithmetical division, the averages M1 and M2, which are then processed to calculate Y and X according to the flow chart of FIG. 8. This microprocessor can also be equipped with a clock signal generator and by itself assure the control of reversing switches 5 and 6, multiplexer 3 and converter 7 as shown diagrammatically by connection 11 in FIG. 9.

Figure 10:
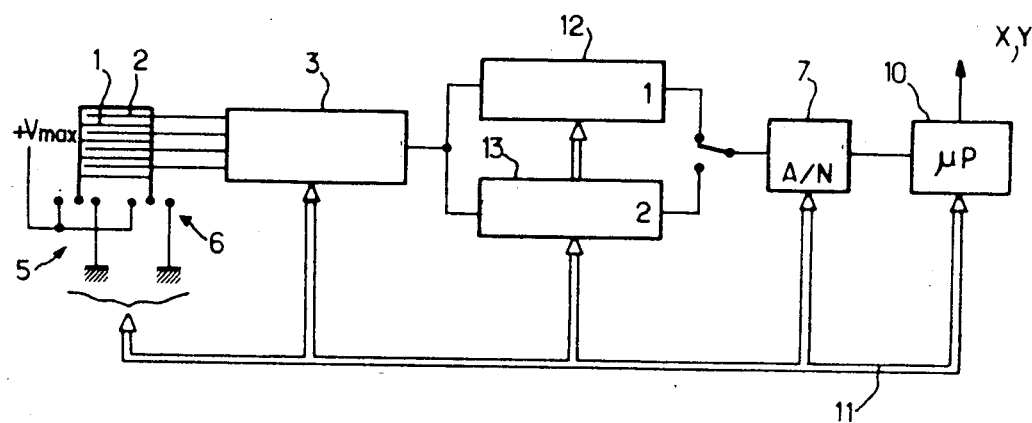
FIG. 10 is a modified diagram for analog processing of the averages.

In the embodiment of FIG. 10, the same elements are found, up to measuring line 4 coming from multiplexer 3, but this embodiment differs in the manner of working out the average of the measurements. Actually in this embodiment, two averaging devices 12 and 13, assigned respectively to values M1 and M2, are used. They operate in an analog manner to take the average of the corresponding signal and are placed upstream from one analog-to-digital converter 7, which converts into a digital measurement only the final result of the analog averages. The remainder of the device, is similar to FIG. 9, except that microprocessor 10 is relieved of a considerable part of the data storage.

Figure 11:
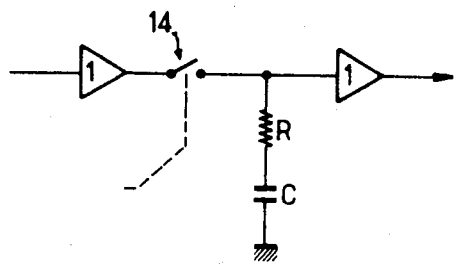
FIG. 11 is a detailed diagram of one of the embodiments of the analog averaging devices.
Figure 12:
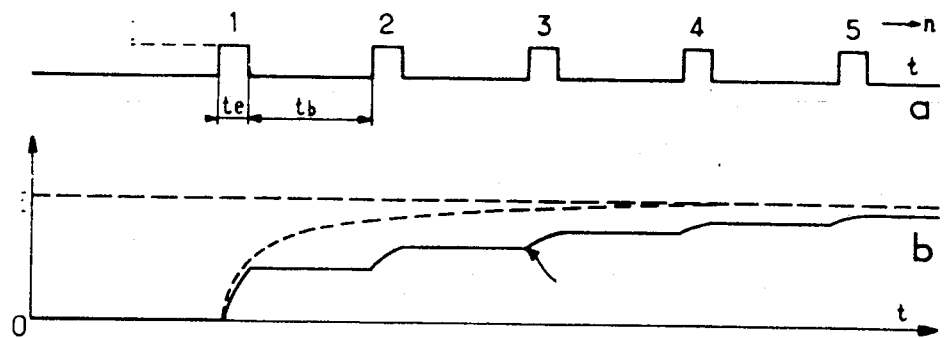
FIG. 12 is a graph showing voltage curves as a function of time illustrating the operation of the device of FIG. 11.

Analog averaging devices 12 and 13, may be simply low-pass filters, or circuits such as the sample and hold circuit shown in FIG. 11, which assures charging of capacitance C through resistance R, only during the very short sampling times when electronic switch 14 is closed. Outside of the sampling periods, capacitance C remains charged at a constant value. The functioning of this diagram is shown in FIG. 12 where 12a shows the curve of sampling pulses and 12b the output voltage of the device. This latter reflects, by amplifying it, the voltage of capacitance C which follows a stepped charge curve, assuming capacitance C to be initially discharged.

It can be seen that this circuit acts like an RC low-pass cell of known properties. If te represents the length of the sampling pulse and tb the holding period (rest), the period of taking the average of n sample is therefore n(te+tb). The time constant of the equivalent RC cell is: RC(te+tb)/te. It is therefore possible to obtain good filterings with small R and C components by the sole set of the cyclic ratio te/tb. For a good functioning of the circuit te < RC n.te > 3 RC are preferably chosen.

It should be noted that the time constant of the filter can be modified by the control program by acting on the periods of te and tb, without altering the physical components R and C. In particular, it is possible to adopt different parameter sets (n, te, tb) for detection (Y) and measurement (X) to optimize, in each case, the ratio between the noise rejection and overall reaction time. This adjustment is, of course, independent of that of the sampling frequency which should be made according to the indications given above for a good rejection of ambient noise.

Figure 13:
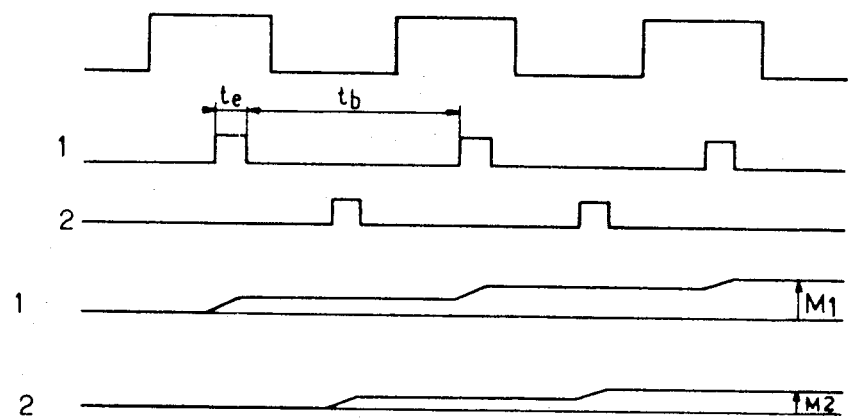
FIG. 13 is a graph showing curves corresponding to the use of these devices in the present invention.
Figure 14:
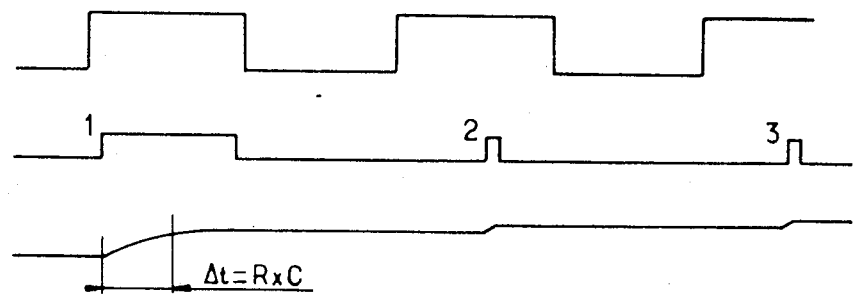
FIG. 14 is a graph showing curves corresponding to the use of those devices in the present invention.

The application of this type of analog averaging device to the process and device according to the invention is shown in FIGS. 13 and 14 where are seen respectively as 13a the clock signal, as 13b and 13c respectively the sampling pulses, and finally as 13d and 13e respectively the outputs of the two filters corresponding respectively to the two measurements M1 and M2.

By way of example, it is possible to adopt the following values:

$te = 50\ \mu s$
$tb = 300\ \mu s$ } sampling frequency = 2.8 kHz $n = 20$ $R.C. = 100\ \mu s$ As a variant it is possible to use a single analog averaging device instead of the two averaging devices 12 and 13 above by connecting it so that it directly performs the subtraction M2−M1, by reversing the signal of one out of two samples. This is a gain in simplicity, but a loss in the benefit of the validity criterion during the measurement of X.

With this analog sample and hold circuit, there is a hangover effect from one measurement to the next which is due to the fact that capacitance C is initially charged. This drawback can be eliminated by precharging the capacitance to a voltage established in advance, for example 0 or Vm/2, and by appropriately correcting the error.

A more advantageous variant consists in modifying the sampling signal so that the first pulse will be extended beyond the time constant of the averaging devices, as shown in FIG. 14. This variant makes it possible to accelerate the detection and measurement by reducing the number of samples necessary for determination of the average.

Finally, it should be understood that the term "average" used in the above description should be understood in the broad sense and covers both an arithmetical average and an average according to the criterion of least squares or other similar method.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for determining the coordinates of a conductive object on a sensitive surface, wherein said surface is in the form of an insulating support carrying a grid formed by two terminals between which resistant strips are connected in parallel and conductive strips placed between said resistant strips, said conductive strips individually connected to a selection means which successively samples the voltage of each conductive strip, said method comprising the steps of:

determining a digital coordinate during a first phase by:
polarizing said two terminals in phase with a clock signal;
sampling the voltage of each conductive strip separately during the on and off periods of said clock signals;
averaging the samples separately for said on and off periods;
comparing the averages for said on and off periods for each conductive strip to locate which conductive strip has a large difference between the averages and to indicate which conductive strip is in contact with said resistant strip;
determining the digital coordinate to be the number of the located conductive strip; and determining an analog coordinate during a second phase by:
leaving the selection means in contact with the located conductive strip;
polarizing said two terminals in opposite phase with the clock signal to create current in each direction alternately in each resistant strip;
sampling the voltage of each conductive strip separately during each current direction;
averaging the sample separately for each current direction; taking the difference of said averages to compute the analog coordinate.

2. A method as in claim 1, wherein during the second phase, the sum of the two averages is compared with the maximal voltage and the computation of the analog coordinate is validated only if the absolute value of the difference between these two values is less than a determined threshold.

3. A method as in claim 1, wherein, during said first and second phases the averages are taken by an analog-to-ditigal conversion of the voltage sampled by the selection means, followed by an arithmetic calculation from the values thus digitized.

4. A method as in claim 1, wherein, the average is taken by a least squares computation of the samples.

5. A method as in claim 1, wherein the sampling frequency is selected from the terms of a series expressed by $2Fr/(n+\frac{1}{2})$ where Fr is the frequency of the local distribution grid and n is a non-negative small integer.

6. A method as in claim 1, wherein, during said first and second phases the averages are taken by a low-pass filter to produce an average signal followed an analog-to-digital conversion to transform the average signal into a value usable for detection of said digital coordinate and computation of said analog coordinate.

7. A method as in claim 6, wherein said low-pass filter is a sample and hold circuit whose time constant is modified by changing the cyclic ratio of the sampling pulse.

8. A method as in claim 6, wherein a single averaging device is used during said first and second phases for determining both coordinates.

9. A device for determining the coordinates of a conductive object contacting a semianalog sensitive surface, said surface having a grid formed by two terminals between which are connected in parallel a plurality of resistant strips and detecting strips placed between said resistant strips and individually connected to a selection means, said device comprising:
   a clock signal generator;
   reversing switch means coupled to said clock signal generator for switching each of said two terminals between a polarization voltage and ground after each clock cycle of said clock signal generator, so that the terminals are connected in phase or in opposite phase to said clock signal;
   sampling means for sampling the voltage on said detecting strips in synchronism with the clock signal;
   averaging means for determining the average of a number of samples separately for each half of the clock signal; and
   logic means for controlling said reversing switch means, said selection means and sampling means, for counting said samples and for calculating the values of said coordinates.

10. A device as in claim 9, wherein said averaging means includes an analog-to-digital converter upstream from said logic means.

11. A device as in claim 9, wherein said averaging means includes an analog low-pass filtering means placed upstream from an analog-to-digital converter ahead of said logic means.

* * * * *